(No Model.)

H. NORTHWOOD.
MANUFACTURE OF GLASSWARE.

No. 392,450. Patented Nov. 6, 1888.

Witnesses:
A. B. Blackwood.
G. Smith.

Inventor,
Harry Northwood.
by Connally Bros
Attorneys.

N. PETERS, Photo-Lithographer, Washington, D. C.

UNITED STATES PATENT OFFICE.

HARRY NORTHWOOD, OF WHEELING, WEST VIRGINIA.

MANUFACTURE OF GLASSWARE.

SPECIFICATION forming part of Letters Patent No. 392,450, dated November 6, 1888.

Application filed September 27, 1887. Serial No. 250,833. (No specimens.)

*To all whom it may concern:*

Be it known that I, HARRY NORTHWOOD, a subject of the Queen of Great Britain, residing at Wheeling, West Virginia, have invented certain new and useful Improvements in Manufacture of Glassware; and I do hereby declare the following to be a full, clear, and exact description of the invention, reference being had to the accompanying drawings, which form part of this specification.

My invention has relation to fancy glassware, and has for its object the provision of a novel and beautiful article of glassware and the provision of means for manufacturing the same.

As a new article, my invention consists in a glassware having an exterior coating of unvitrified sand, acid-roughed or etched.

My improved method of manufacture consists in dipping or rolling a gathering of hot glass, which may be either crystal, colored, flashed, or sensitive glass, in sand until the latter adheres to the surface, then manipulating the coated gathering to form the desired article, and finally acid-roughening or etching the completed article so as to produce a lusterless surface similar to a peach-skin.

Figure 1:
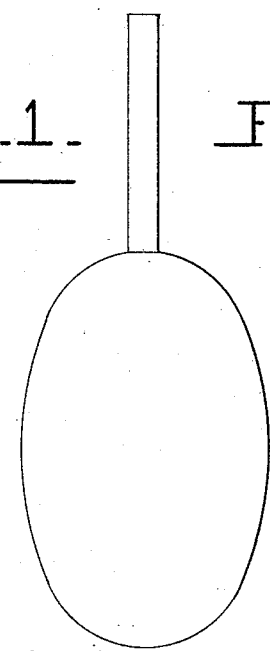
Figure 2:
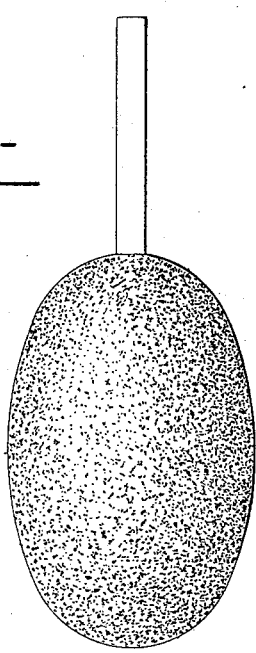
Figure 3:
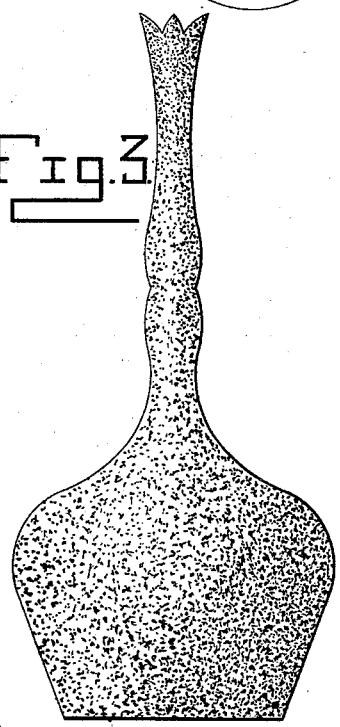
Figure 4:
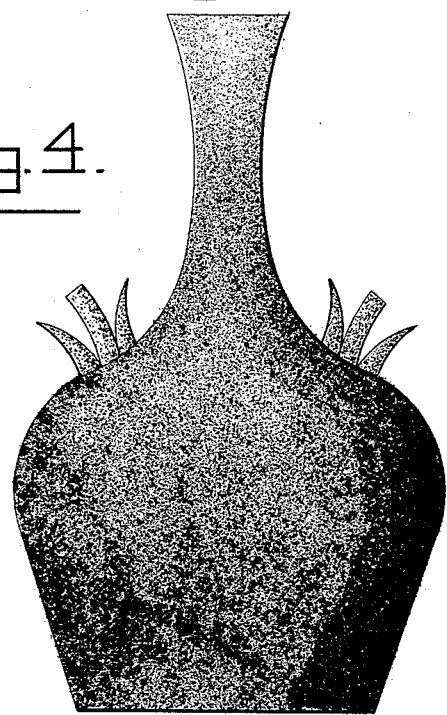

Referring to the accompanying drawings, wherein I have illustrated the article in its various stages of manufacture, Figure 1 shows a gathering of glass as it is taken from the pot. Fig. 2 shows the same after having been dipped in or covered with sand; Fig. 3, the shaped article made from the same, and Fig. 4 the complete and finished article.

After the gathering has been dipped, so as to present the appearance shown in Fig. 2, it may be blown, molded, pressed, or in any other way fashioned to the desired shape; but as the fashioning of the glass forms no part of my invention, and the manner of doing so is well known, it need not be particularly described.

It is essential to the practice of my invention that the glass after being dipped in or covered with the sand should not be subjected to so high a degree of heat as will melt or vitrify the sand, as this would interfere with or entirely prevent the production of the desired effect in the finished article.

The article manufactured according to my improved method presents a strikingly beautiful effect, the surface being very dense and rough.

I am aware that it is not new to acid-rough or etch the surface of articles of glassware, and I am also aware that it has been the practice to ornament glassware by sprinkling particles of colored glass, mica, &c., upon the surface of the hot glass; but these processes differ from mine, as I employ simply ordinary sand, not for the purpose of producing an effect of coloring, but to produce a denser and rougher surface than has heretofore been had.

Having described my invention, I claim—

As a new article, glassware having a surface of lusterless adherent unvitrified sand, substantially as described.

In testimony that I claim the foregoing I have hereunto set my hand this 14th day of September, 1887.

HARRY NORTHWOOD.

Witnesses:
PERCY J. BEAUMONT,
R. T. HOWELL.